Patented Oct. 4, 1932

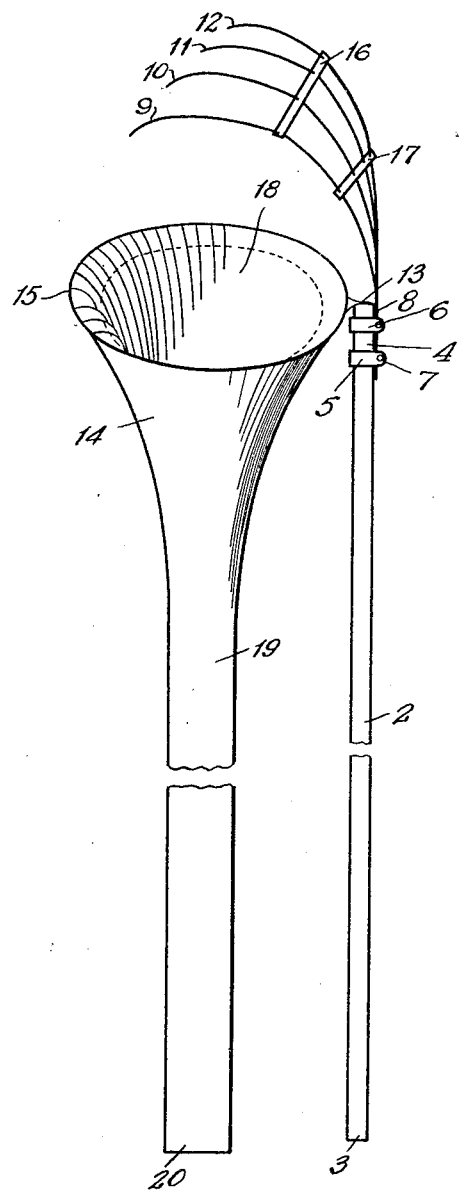

1,881,134

UNITED STATES PATENT OFFICE

MAX SCHLING, OF SCARSDALE, NEW YORK

FRUIT PICKER

Application filed December 20, 1930. Serial No. 503,655.

My invention relates to a new and improved apparatus for and method of fruit picking and more particularly relates to a novel apparatus for picking fruit, such as apples, from the apple tree.

Numerous apple pickers have been proposed heretofore arranged to employ a person operating from the ground to remove apples from the tree.

In these arrangements, an elongated handle is provided by means of which the person may remove the apple from the stem whereupon the apple falls into some container.

These apple pickers have never been successful due mainly to the fact that the apples have been arranged to fall into an enlarged container and in falling hit against each other and are bruised.

Accordingly, it is an object of my invention to provide a novel and improved apple picker.

A further object of my invention is to provide a novel and improved apple picker which prevents apples from striking against each other and becoming bruised.

In the drawing, the figure is a perspective view of my improved apple picker.

As shown, it comprises an elongated handle 2 which the operator grasps at its lower end as at 3. Surrounding the upper end of the handle as at 4 are two sleeves 5 and 6 secured in position by any well known means, as for example rivets, as shown at 7. Interposed between the sleeves 5 and 6 and the arm 2 are the extension wires 8 of the prongs 9 to 12 and also a bracket extension 13 of chute 14.

As will be well understood, the sleeves 5 and 6 are secured to tightly grasp and hold the extensions 8 of prongs 9 to 12 and the bracket extension 13 of chute 14 securely in position with respect to the arm 2. The prongs 9 to 12 are held in position by means of spacers 16 and 17 each of which is perforated, the prongs 9 to 12 extending through the perforations of spacers 16 and 17.

As will be understood by those skilled in the art, the spacings between the prongs 9 to 12 may be varied in accordance with the quality of fruit picked and the conditions of the tree. Thus, for example, if desired the spacer 16 may be slid towards the ends of the prongs 9 to 12 decreasing the spacing between the prongs, or slid toward the spacer 17 to enlarge the spacing.

The prongs 9 to 12 are presumably made of springy metal material although any other well known material may be used. The chute 14 is preferably made of cloth and is hemmed over the edge of a curved, preferably circular, metal frame 15. The chute is provided with an enlarged opening at 18 at the top thereof and narrows down to an opening at 19 which is approximately just large enough to permit an apple to pass through.

With this arrangement of the chute, when the person operates the handle 3, moving the prongs 9 to 12 about the stem of an apple and removes the apple from the branch of the tree, the apple drops into the opening 16 where the fall is broken by the cloth at or near the mouth of the chute as for example, just below the ringed frame. The apple now slowly rolls toward the narrow opening 19 where it is permitted to slowly drop down through the funnel shape 19 to a receiving basket (not shown) which is placed underneath the bottom open end 20.

Inasmuch as the apple, as soon as its fall is broken in the mouth of chute 14, rolls toward the funnel 19, the mouth is immediately free to receive the next apple. Accordingly, when the next apple falls, the preceding apple has already passed from the mouth or enlarged opening to the funnel 19. Therefore, in the first drop no two apples will collide with each other causing any bruising. Apples which may happen to engage each other in the funnel 19, will not bruise each other since they are moving here at a rather slow rate.

In this manner, by first breaking the fall of the apple and then quickly removing it to a funnel where it cannot be struck by another falling apple, injuries to the apple are prevented.

As will be obvious, the handle 2 may be tilted at an angle with respect to the chute in order to reach any angular position of the tree. Furthermore, the handle 2 may be arranged in telescopic form and moveable with respect to each other. Each section of this telescopic arrangement may be secured in position at any relative point with respect to the next section to enable any desired length of the arm 2 for reaching all heights of the tree.

While I have described my invention in connection with the specific embodiment thereof, it may still take other forms and I do not wish to limit my invention to the specific illustration thereof herein given, except insofar as set forth in the appended claim.

I claim as my invention:

In a fruit picker, a ring having a receptacle secured thereto and extending therefrom, said receptacle comprising a bag structure having an enlarged opening at the end secured to said ring and gradually narrowing down to a relatively narrow-like funnel, the bag opening being shaped to break the fall of fruit picked and feeding it to a funnel-like opening of cross-sectional area just sufficient to permit a slow gravitational movement of the fruit; a handle comprising a plurality of sections telescoping each other for varying the length of the handle; a bracket for securing said handle to said ring at the enlarged open end of the bag; a plurality of flexible metallic prongs; braces for securing said prongs to said handle at its upper end; and a plurality of spacers comprising cross bars, each provided with spaced perforations through which said prongs extend for maintaining said prongs in spaced relation with each other, said bars being movable longitudinally along said prongs for varying the spacing thereof.

In testimony whereof I affix my signature.

MAX SCHLING.